United States Patent
Walter et al.

(10) Patent No.: US 7,997,316 B2
(45) Date of Patent: Aug. 16, 2011

(54) SEAL ARRANGEMENT FOR A TIRE PRESSURE-REGULATING DEVICE

(75) Inventors: Wilhelm Walter, Poppenhausen (DE); Robert Heuberger, Schweinfurt (DE); Marc-Andre Schaefer, Vechtelhausen (DE)

(73) Assignee: Schaeffler KG, Herzogenaurach (DE)

( * ) Notice: Subject to any disclaimer, the term of this patent is extended or adjusted under 35 U.S.C. 154(b) by 146 days.

(21) Appl. No.: 12/278,834

(22) PCT Filed: Jan. 18, 2007

(86) PCT No.: PCT/DE2007/000079
§ 371 (c)(1),
(2), (4) Date: Aug. 27, 2008

(87) PCT Pub. No.: WO2007/090361
PCT Pub. Date: Aug. 16, 2007

(65) Prior Publication Data
US 2008/0314487 A1    Dec. 25, 2008

(30) Foreign Application Priority Data
Feb. 10, 2006 (DE) .......................... 10 2006 006 143

(51) Int. Cl.
*B60C 23/00* (2006.01)
*F16C 33/78* (2006.01)
(52) U.S. Cl. ......... 152/417; 384/486; 384/544; 277/563
(58) Field of Classification Search .......... 152/415–418; 384/477, 484, 485, 479, 487, 544; 277/563
See application file for complete search history.

(56) References Cited

U.S. PATENT DOCUMENTS

| | | | | |
|---|---|---|---|---|
| 4,428,630 A * | 1/1984 | Folger et al. | ................. | 384/482 |
| 4,804,027 A * | 2/1989 | Runels | .......................... | 152/417 |
| 4,844,138 A * | 7/1989 | Kokubu | ........................ | 152/417 |
| 5,080,157 A * | 1/1992 | Oerter | .......................... | 152/417 |
| 5,147,494 A * | 9/1992 | Torii et al. | ..................... | 156/417 |
| 5,174,839 A * | 12/1992 | Schultz et al. | ................ | 152/415 |
| 5,421,591 A * | 6/1995 | Katzensteiner | ............... | 277/550 |
| 5,484,213 A * | 1/1996 | Caillaut et al. | ................ | 384/486 |
| 5,503,480 A * | 4/1996 | Caillaut et al. | ................ | 384/477 |
| 5,522,600 A * | 6/1996 | Duckwall | ..................... | 277/402 |
| 5,587,698 A * | 12/1996 | Genna | ........................... | 340/442 |
| 5,642,946 A * | 7/1997 | Caillault et al. | .............. | 384/486 |
| 6,199,611 B1 * | 3/2001 | Wernick | ........................ | 152/417 |
| 6,315,457 B1 * | 11/2001 | Kapaan et al. | ................ | 384/544 |
| 6,623,165 B1 * | 9/2003 | Akagami et al. | .............. | 384/477 |
| 6,857,457 B2 * | 2/2005 | Nienhaus | ....................... | 152/417 |
| 7,625,127 B2 * | 12/2009 | Foti et al. | ...................... | 384/484 |

(Continued)

FOREIGN PATENT DOCUMENTS

DE    37 38 529 A    10/1988

(Continued)

*Primary Examiner* — Russell D Stormer
(74) *Attorney, Agent, or Firm* — Lucas & Mercanti, LLP

(57) ABSTRACT

A seal arrangement for a tire pressure-regulating device for a motor vehicle, which provides a compressed-air supply to a tire of a vehicle through a hole in an inner ring of a rolling bearing of a wheel bearing, through a seal housing which is connected to a wheel hub in a rotationally fixed manner, and through the wheel hub itself. A flat seal is fixed on the inner ring of the rolling bearing and the radially outer end of the seal has a sealing lip which is directed towards the seal housing and bears against it.

14 Claims, 4 Drawing Sheets

U.S. PATENT DOCUMENTS 7,661,883 B2 * 2/2010 Gresley .................. 384/130
2005/0205182 A1 * 9/2005 Maquaire et al. ............ 152/417

FOREIGN PATENT DOCUMENTS

| | | | |
|---|---|---|---|
| EP | 0 362 921 A | 4/1990 |
| EP | 0 656 267 A | 6/1995 |
| EP | 0 713 021 A | 5/1996 |
| FR | 2 862 908 A | 6/2005 |
| JP | 04185535 A | * | 7/1992 |

* cited by examiner

SEAL ARRANGEMENT FOR A TIRE PRESSURE-REGULATING DEVICE

FIELD OF THE INVENTION

The invention relates to a seal arrangement for a tire pressure regulating device for a motor vehicle, with a compressed air supply which leads out of the region of a wheel axle into a wheel hub carrying the vehicle tire.

BACKGROUND OF THE INVENTION

The correct tire pressure in the wheels of a motor vehicle is an essential safety factor for their operation during driving, and it must constantly be ensured that it is always kept within the tolerance limits. The tire pressure of a motor vehicle influences not only, to a particular extent, safety during braking and steering, but also the useful life of the tire as well as the driving behavior of the vehicle. Furthermore, by a deliberate variation of the tire pressure, the driving properties of a vehicle can be set optimally for travel on paved roads and in terrain.

In conventional tire pressure regulating systems, for example according to U.S. Pat. No. 4,434,833, compressed air is supplied from an air supply source via an air pipe to an air passage in an axle housing, and the compressed air is subsequently fed into the tire via a further air passage and an air pipe in the axle.

DE 28 54 772 A1 shows a device for monitoring the tire pressure on a motor vehicle, in which a pressure testing system is installed stationarily for each tire and consists in each case of a pressure tester connected to a valve of the tire via an air line. This pressure tester is connected via an electrical line to an electronic monitoring apparatus which responds to pressure and to which a signal generator is assigned.

Since the supply of air for a vehicle tire in tire pressure regulating systems usually takes place through the wheel bearing designed as a rolling bearing, an essential aspect is the gas tightness of the gas supply particularly in the rolling bearing or in its immediate surroundings. In this case, a compressed air leakage as a result of the penetration of leakage air from the sealing system of the compressed air leadthrough into the rolling bearing is to be avoided.

Known seals on compressed air leadthroughs through a wheel bearing nevertheless have a more or less pronounced leakage. On account of this, contaminated air passes in an undesirable way into the inner space of the rolling bearing, and this may lead to the contamination of the lubricant, for example the bearing grease. Furthermore, water may penetrate into the rolling bearing and cause deficient lubrication. Solid particles penetrating into the wheel bearing are rolled over there by the rolling bodies, and therefore imprints of material in the running surfaces occur. If the internal pressure in the rolling bearing rises, this leads to higher seal wear and to the failure of the seal. Moreover, the lubricant is pressed out of the rolling bearing, and this likewise causes deficient lubrication. Sealing lips present in the rolling bearing are also often overturned or seals are pressed out of the rolling bearing. All these problems lead to premature bearing failure and therefore to increased costs. A high leaktightness, reliable throughout the desired useful life, of the rolling bearing with respect to the devices of the tire pressure regulating system is therefore of particular interest.

DE 199 16 106 C2 discloses a machine element as a leadthrough element for leading through media during rotation of two machine parts which are guided with respect to one another on rolling bearings and through which a medium flows and between which a seal is arranged. The seal possesses two pairs of sealing lips, one pair of sealing lips of which is located in one machine part and seals off dynamically with respect to this. The second pair of sealing lips is seated firmly in the second machine part and seals off statically with respect to this. Between the pairs of sealing lips are located bores which serve for the throughflow of media, such as, for example, gas, compressed air, oil, water, etc. Furthermore, spring elements are mounted between the pairs of sealing lips and ensure that the pairs of sealing lips are pressed firmly against the machine parts. A disadvantage in this case is the complicated set-up of the seal due to the provision of the spring elements and the large number of sealing lips in order to achieve leaktightness between the machine elements and the rolling bearing.

DE 690 05 731 T2 discloses a sealing device for a tire pressure regulating system, in which a rolling bearing is arranged between an axle housing guided on an axle and a hub carrying a wheel disk with a tire. This rolling bearing is located in an air conduit consisting of air pipes and has centrally an annular seal device which is fastened firmly to the inner circumferential surface of the hub. The seal device consists of a plurality of stepped parts, angled parts, holding rings, spacer rings and end plates with main and auxiliary seals consisting of fluororubber and having a plurality of sealing lips which bear against the axle housing. The main seal has a self-lubricating thin plate which is fastened to the lip sliding surface and which is in sliding contact with the axle housing. The seal device has a highly complex and complicated set-up and requires a considerably large construction space. Furthermore, the useful life and therefore the leaktightness of the seal device are limited particularly because of the thin plate on the lip sliding surface.

A tire pressure regulating device according to EP 0 224 674 B1 possesses an axial compressed air supply through the wheel hub into an annular space between the wheel hub and the wheel hub housing. The annular space is sealed with respect to the lubricant-carrying spaces by means of seals. The seal device consists of multiple labyrinth seals which are framed in a sleeve located on the wheel hub side and in a sleeve located on the wheel hub housing side. The seal lamellae consist of steel coated with plastic flakes and grease being introduced into the lamellae interspaces for sealing-off purposes. The labyrinth seals are therefore complicated to produce and to mount.

OBJECT OF THE INVENTION

The object on which the invention is based is to provide a seal arrangement for a tire pressure regulating device of the type initially mentioned, which prevents the penetration of leakage air into rolling body-guiding regions of the rolling bearing of a wheel bearing and consequently the infiltration of impurities and which is additionally also cost-effective to produce and to mount.

SUMMARY OF THE INVENTION

The invention is based on the recognition that impurities and foreign substances which pass into the rolling bearing of a wheel bearing due to air pressure leakages may lead to bearing failures. This can be prevented by integrating a sealing system into the wheel bearing or rolling bearing, which discharges leakage air out of the region of the latter in a directed manner.

The set object is achieved by means of a seal arrangement for a tire pressure regulating device for a motor vehicle, with a compressed air supply to the vehicle tire through a bore in the inner ring of a rolling bearing of the wheel bearing, a seal housing connected fixedly in terms of rotation to the wheel hub, and the wheel hub itself, there being fastened on the inner ring of the rolling bearing a flat seal, the radially outer end of which has a sealing lip directed toward the seal housing and bearing against the latter.

This seal arrangement, by virtue of its set-up, ensures that the leakage air unavoidably occurring during a filling operation does not pass into the region of the rolling bodies, so that an ingress of water and/or of dirt is advantageously avoided, thus resulting in an increased useful life of the rolling bearing. Instead, the leakage air can be diverted outward into the atmosphere in a directed manner.

It is pointed out that the seal arrangement according to the invention can be used not only in a tire pressure regulating device for a motor vehicle, but also in other devices carrying compressed air, in which a rolling bearing is located in the immediate vicinity or in which a compressed air rotary leadthrough is formed directly in a rolling bearing.

Reference is made below, however, to a tire pressure regulating device. The invention is likewise suitable for devices in which gases other than air or other media are employed.

It is particularly advantageous in the seal arrangement according to the invention that, with a rising pressure on the flat seal, the contact area of the sealing lip on the seal housing increases, thus leading to a more beneficial pressure distribution and therefore to a lower moment of friction and a lower temperature and/or to less wear between the rotating and the stationary parts of the seal.

In the normal state of the flat seal, a small sealing lip overlap ensures low wear.

When the tire pressure regulating device is in operation, the compressed air leakage rises and is prevented, by the flat seal having the sealing lip directed at its outer end toward the sealing housing and bearing against the latter, from passing into that region of the rolling bearing in which the rolling bodies are arranged. This therefore affords very good sealing in the event of leakage.

According to a further refinement of the seal arrangement according to the invention, the flat seal preferably consists of an elastic elastomer or plastic material, this being advantageous in terms of wear.

Moreover, there may be provision for the flat seal to be connected to a carrier part arranged firmly on the inner ring of the rolling bearing. In this case, the carrier part preferably consists of sheet steel. A stable position and a certain strength of the seal are thereby achieved. Furthermore, the seal, together with the carrier part, can be produced and mounted in a simple way.

According to a preferred embodiment of the invention, there is provision for there to be fastened within the seal housing at least one, preferably two sliding rings, of which the inner surface pointing away from the seal housing is in sealing contact with the outer surface, pointing toward the seal housing, of a sheet metal ring, in particular of an L-shaped and/or split sheet metal ring.

Preferably, the sheet metal ring may have a trough-shaped design in cross section, two L-shaped parts being intermeshed with one another and forming the drop shape. On its bottom pointing toward the bearing inner ring, the sheet metal ring may have a bore. Furthermore there may preferably be provision for the bottom side, facing the bearing inner ring, of the sheet metal ring to lie, in particular positively, on the flat seal in the region of its air supply bore.

Moreover, an integral part of the invention is that leakage reception spaces for the reception or transfer of leakage air are formed essentially between the flat seal and the inner ring-side end of the seal housing or of the sliding ring. The leakage reception spaces are in this case arranged on the right side and on the left side of the air supply bore in the inner ring and are designed in such a way that they are flow-connected to bores for the discharge of leakage air and to the sealing gap between the sliding ring and the sheet metal ring.

In order to discharge the leakage air out of the rolling bearing, several possibilities are available. According to a first variant, bores, oriented axially parallel to the compressed air supply, for discharging the leakage air occurring when the tire is being filled with compressed air are formed in the flat seal and in the inner ring of the rolling bearing. In the event of an air overpressure which occurs when the tire is being filled with compressed air, the leakage air is discharged into the surrounding atmosphere via the bores which, if appropriate, are connected to a venting valve.

In a second variant, bores, oriented axially parallel to the compressed air supply, for discharging the leakage air occurring during the supply of compressed air are formed in the seal housing. In this case, the leakage air is diverted into the surroundings via the wheel hub.

According to a further variant of the seal arrangement according to the invention, bores, pointing radially outward, for discharging the leakage air occurring during the supply of compressed air are formed laterally in the seal sheet metal ring of the seal housing.

The discharged leakage air may also be expelled via a journal or a shaft of the wheel bearing into another ventilated system of the vehicle, for example into the axle drive.

In all these variants mentioned above, the ports provided for diverting leakage air may be connected to a venting valve.

BRIEF DESCRIPTION OF THE DRAWINGS

The invention is explained in more detail below by means of some embodiments with reference to the accompanying drawing in which.

DETAILED DESCRIPTION OF THE DRAWINGS

Figure 1:
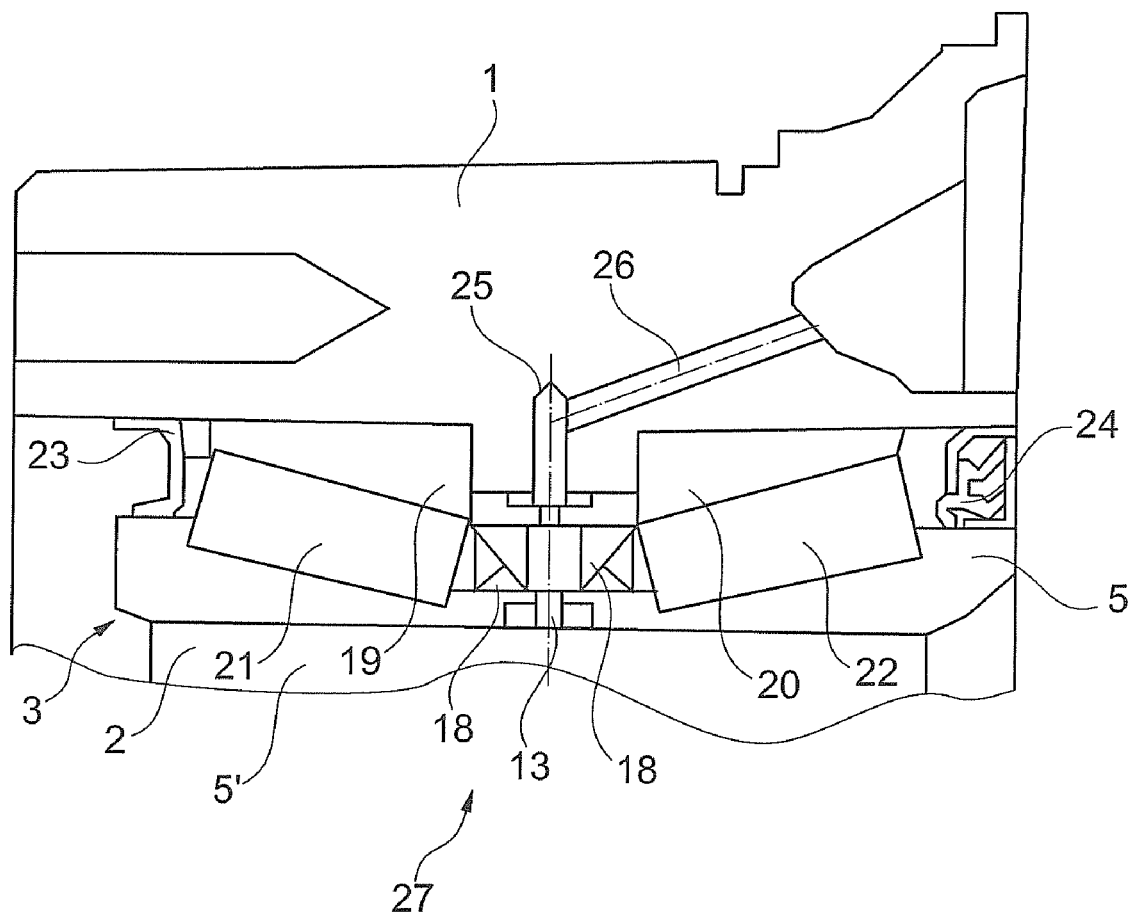
FIG. 1 shows a schematic illustration, in longitudinal section, of a wheel bearing with a tire pressure regulating device and with a two-row rolling bearing.

FIG. 1 accordingly shows a highly simplified illustration, in longitudinal section, of a wheel hub 1 of a motor vehicle wheel with a seal arrangement of a tire pressure regulating device. The wheel hub is suitable for fastening a tire in a way known per se and not illustrated any further here. The wheel hub 1 is mounted rotatably via a wheel bearing on a journal 2 or a wheel axle which carries a rolling bearing 3 with two inner rings 5, 5', two outer rings 19, 20 and rolling bodies 21, 22 arranged between them.

The rolling bearing 3 is filled with a lubricating grease, not illustrated here, for the rolling bodies 21, 22 and is sealed axially on the outside by sealing means 23, 24 and axially on the inside with respect to the inner rings 5, 5', if a radially penetrating bore 13 is present or if a plurality of radially penetrating bores 13 are present, via a seal 18. This seal 18 ensures that, in an operation to fill the tire with compressed air by means of the bores 13 and air supply bores 25, 26 in the wheel hub 1, no leakage air passes into the grease-filled space, receiving the rolling bodies 21, 22, of the rolling bearing 3.

FIGS. 2 to 6 illustrate in detail seal arrangements 18', 18'', 18''', 18'''', 18''''' of the type shown in FIG. 1 which are different, but are in each case designed according to the invention. Their set-up is described below with reference to FIG. 2, the details described largely also being capable of being gathered from FIGS. 3 to 6. Differences in the drawings Figures are in each case explained separately.

Accordingly, seal housings 4 and 4' for the formation of a rotation leadthrough for the air to be conducted into the vehicle tire and of a relevant seal are illustrated between the wheel hub 1 and the journal 2 or axle of the vehicle. The seal housings 4 and 4' are connected fixedly in terms of rotation to the wheel hub 1, so that they are arranged rotatably together with the latter with respect to the journal 2. As already explained in connection with FIG. 1, the journal 2 carries fixedly in terms of rotation the inner rings 5, 5' of the rolling bearing 3, of which only each middle portion can be seen here.

The seal housings 4', 4'' comprise, for example, a sliding ring 6', 6'' connected fixedly in terms of rotation to the seal housing and also a split sheet metal ring 7', 7'' of L-shaped cross-section which is arranged coaxially therein and in the interior of which a trough-shaped space 8 is formed. The sheet metal ring 7', 7'' has on its bottom portion a toothing with a passage orifice 9 and lies on a flat seal 10 which is fastened to the inner rings 5', 5''. The outer end of this seal 10 has a sealing lip 11 directed toward the seal housing 4', 4'' and bearing against the underside of the latter.

The flat seal 10 and the underside of the sheet metal ring or of the seal housings 4', 4'' are designed, then, such that leakage reception spaces 28 and 29 for the reception or transfer of leakage air are formed essentially between the inner ring-side end of the seal housing 4', 4'' and the seal 10. The leakage reception spaces 28 and 29 are designed in such a way that they are flow-connected to the bores 14, 15 discharging the leakage air and to a sealing gap between the sliding ring 6', 6'' and the sheet metal ring 7', 7''.

The flat seal 10 preferably consists of an elastomer or elastic plastic material and here is connected to a sheet steel carrier part 12' arranged firmly on the inner rings 5', 5'' of the rolling bearing 3' and is pushed together with the carrier part on the inner rings 5', 5''. The sealing lip 11 is pointed toward its outer free end and is inclined obliquely inward.

The seal 10, the carrier part 12' and the inner rings 5', 5'' of the rolling bearing 3' possess a common air passage port 13 so as to afford a passage for compressed air from a compressed air supply source, not illustrated in any more detail, of the tire pressure regulating device via the journal 2, the inner rings 5', 5'', the seal 10, the toothing with orifice of the sheet metal ring 7', 7'', the annular space 8 of the seal housing 3' and the wheel hub 1 to a tire, not shown, of a motor vehicle wheel. This compressed air passage is symbolized by the large arrows in FIG. 3.

Figure 2:
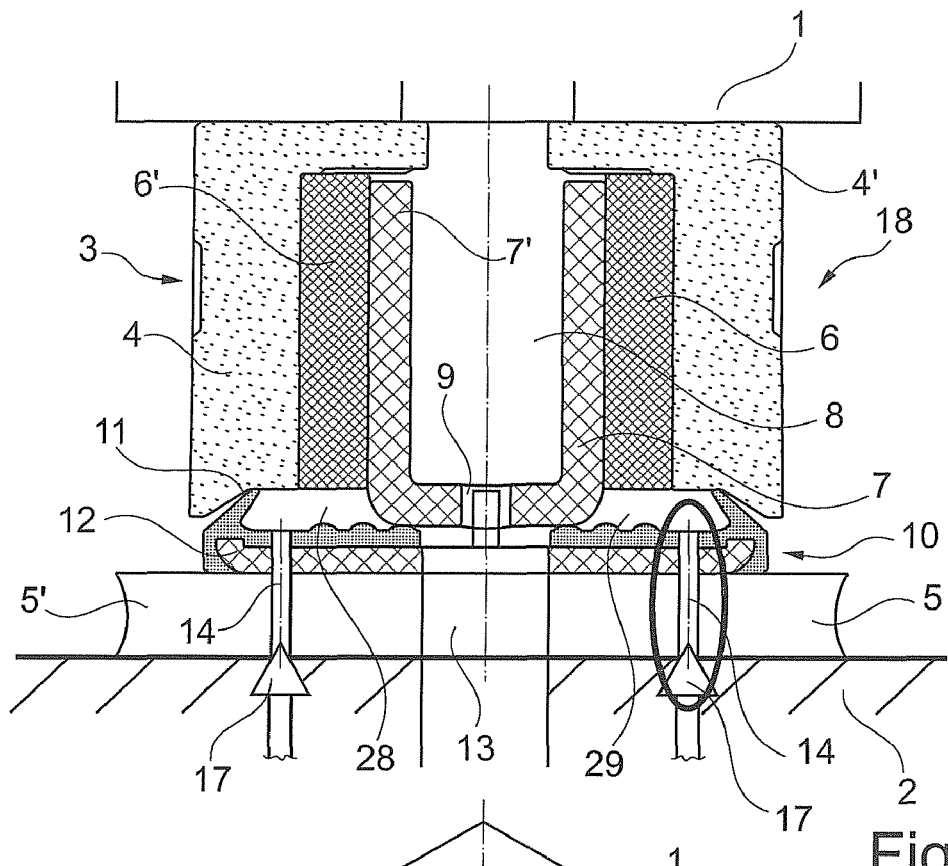
FIG. 2 shows a sectional illustration of a rolling bearing according to FIG. 1 with a seal arrangement according to the invention for the tire pressure regulating device.
Figure 3:
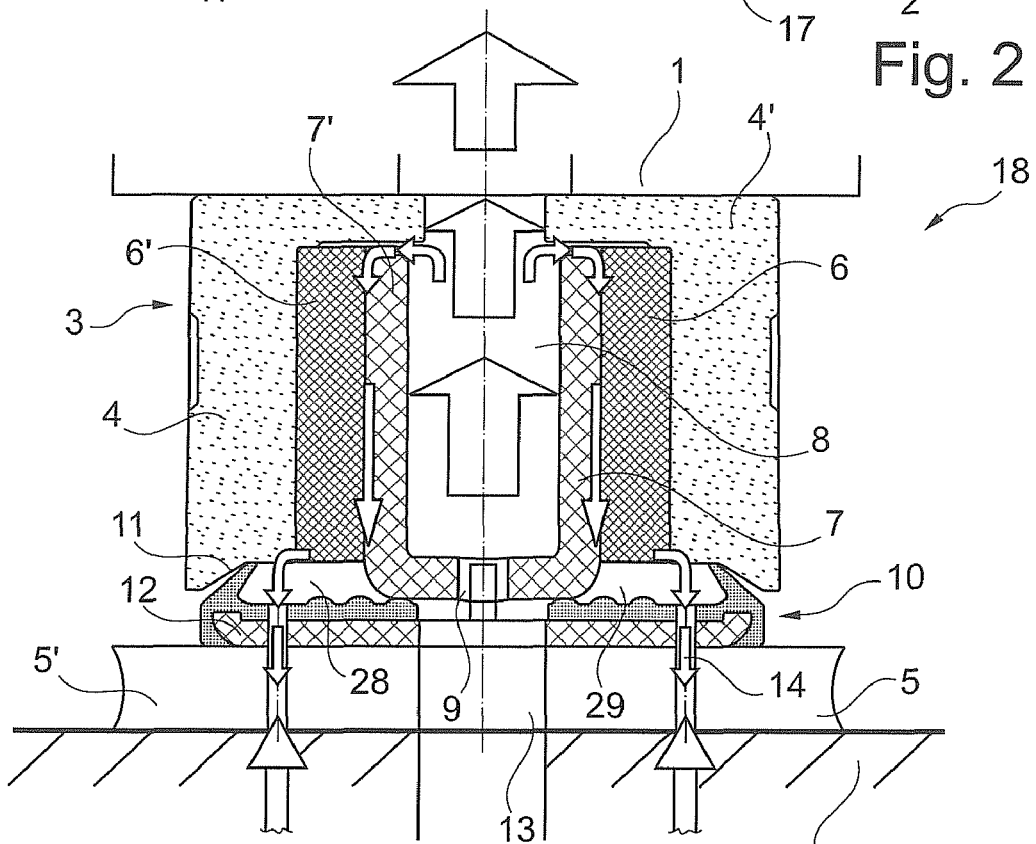
FIG. 3 shows a sectional illustration of the rolling bearing according to FIG. 2 which shows the run of the air conduits in the rolling bearing.

In the embodiment according to FIG. 2, the seal 10', the carrier part 12' and the inner rings 5', 5'' of the rolling bearing 3 are provided with at least two common bores 14 of smaller diameter which are spaced apart from one another in the longitudinal direction and which are oriented axially parallel to the compressed air passage (bore 13). They serve for discharging the leakage air occurring during filling with compressed air. This discharge of leakage air is illustrated, symbolized by the smaller arrows in FIG. 3, and runs essentially in a direction which is opposite to the compressed air supply direction.

In this case, during a filling operation, first, leakage air passes between the sliding rings 6', 6'' and sheet metal rings 7', 7'' and from there into the leakage reception spaces 28 and 29 already mentioned, from which the leakage air escapes into the atmosphere via the bores 14, the inner ring 5', 5'' and the hub 2.

Figure 4:
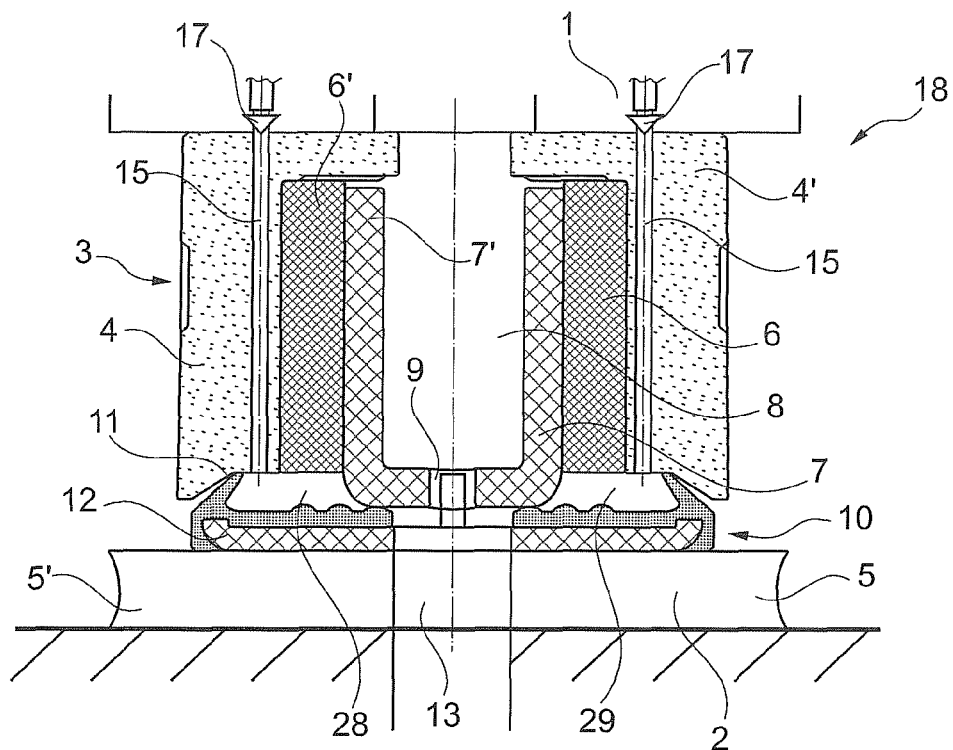
FIG. 4 shows a sectional illustration of the rolling bearing with a second possibility for the discharge of leakage air.

A further variant for the discharge of leakage air occurring during filling with compressed air is illustrated in FIG. 4. For this purpose, in the seal housing 4''', 4'''' two bores 15 are formed which are oriented axially parallel to the compressed air supply (bore 13) and through which leakage air can pass from the leakage reception spaces 28, 29 via the wheel hub 1 into the surroundings.

There may, however, also be provision for the leakage air to be conducted axially outward into the atmosphere via axial bores in the wheel hub which are not illustrated any further here.

Figure 5:
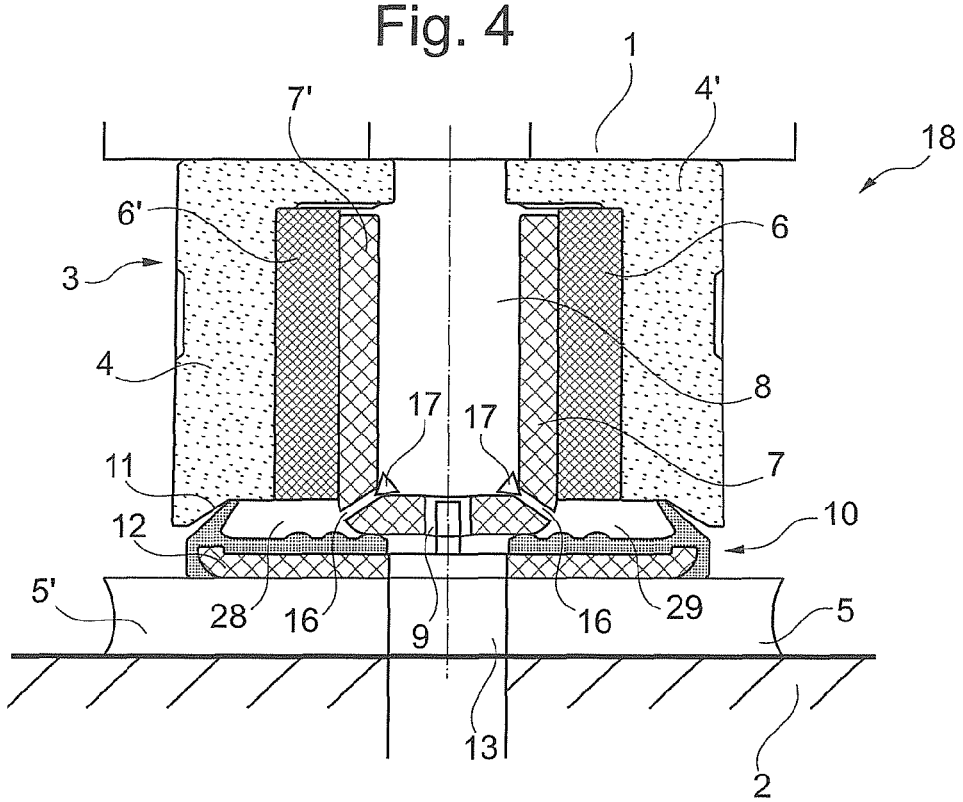
FIG. 5 shows a sectional illustration of the rolling bearing with a third possibility for the discharge of leakage air.

Another variant of the discharge of leakage air occurring during filling with compressed air is shown in FIG. 5. At least two bores 16 for discharging the leakage air are formed in the sheet metal ring 7''', 7'''' of the seal housings 4', 4''. The bores 16 are located in a corner region where the bottom wall and the side walls of the sheet metal ring 7''', 7'''' meet. During a filling operation, the bores 16 are closed, for example, by flexible valve-like sealing means (not shown) arranged in the annular space 8. Leakage air is discharged through the bores 16, in the absence of filling air pressure, in the direction of the wheel hub 1.

Figure 6A:
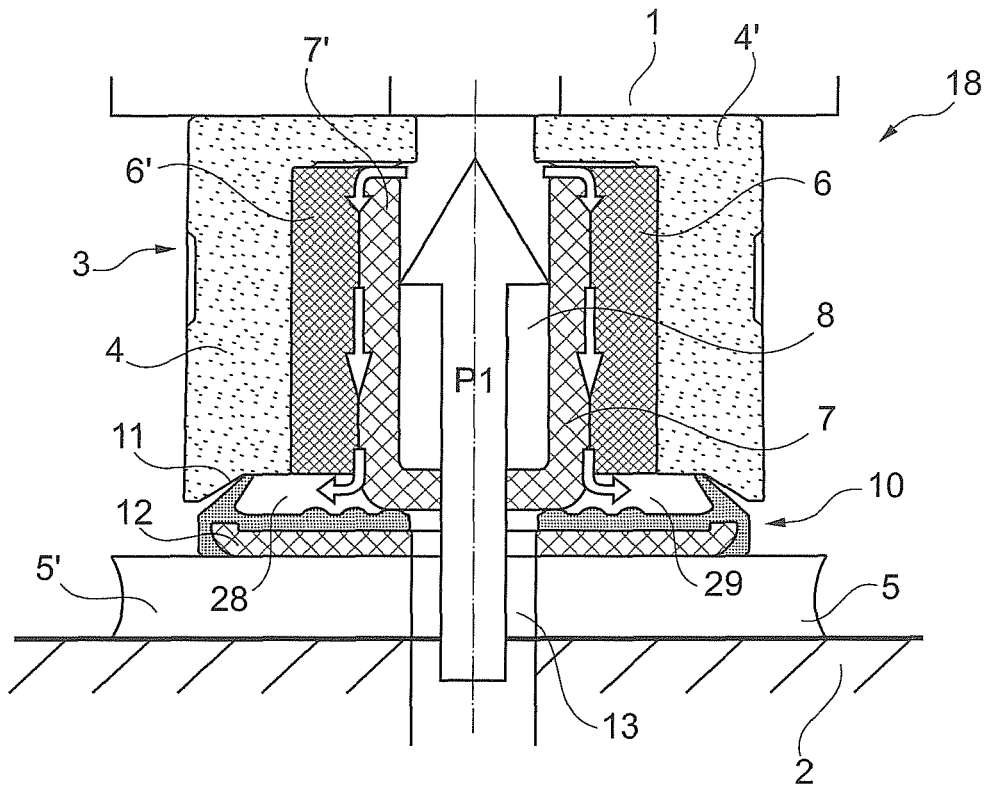
FIG. 6a shows a sectional illustration of the rolling bearing with a storage of leakage air within the seal arrangement in the presence of compressed air.
Figure 6B:
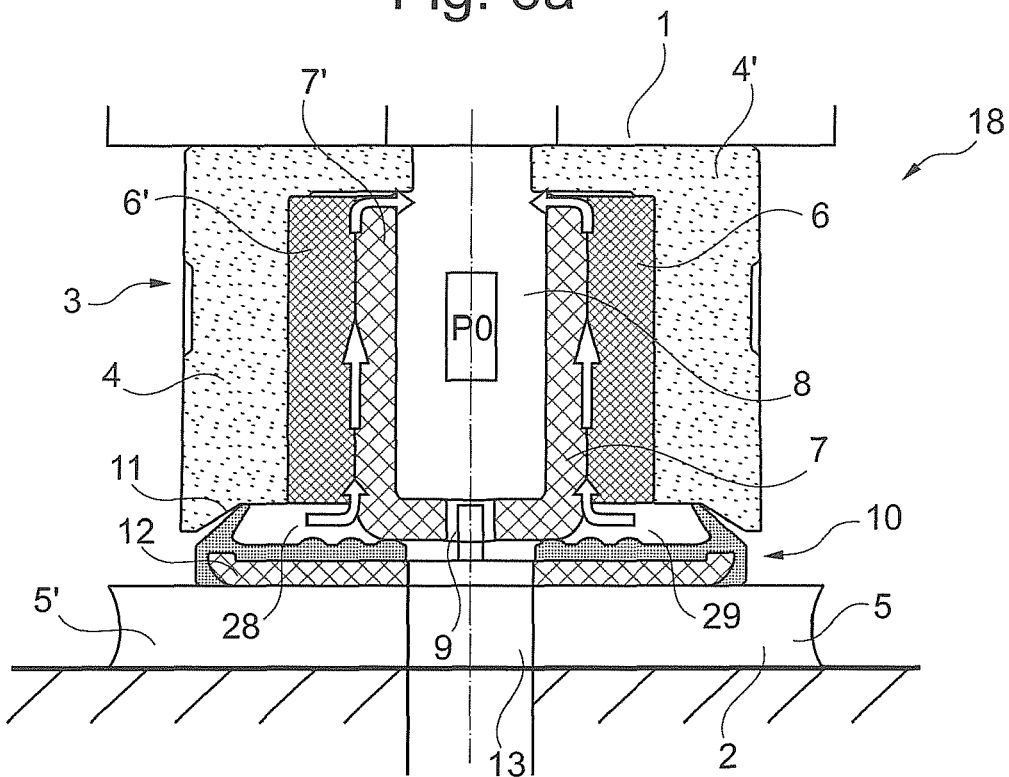
FIG. 6b shows a sectional illustration of the rolling bearing with a recirculation of leakage air out of the seal arrangement according to FIG. 6a in the absence of compressed air.

FIGS. 6a and 6b show a design variant in which no additional port or bore is present for discharging the leakage air occurring during filling with the compressed air. The leakage air is in this case, according to FIG. 6a, in the presence of the air pressure P1 of the tire pressure regulating device, guided via the mechanical seal of the sliding rings 6', 6'' into the leakage reception spaces 28, 29 and temporarily stored there. The discharge of this leakage air takes place, according to FIG. 6b, in the absence of air pressure P0, in the direction of the wheel hub 1.

If appropriate, the bores or ports 14, 15 and 16 provided for diverting leakage air may be connected to a venting valve 17', 17'', 17''', 17'''' as is shown by way of example in FIG. 2.

All the variants, presented here, of the seal arrangements 18', 18'', 18''', 18'''', 18''''' ensure that, in accordance with the object, no leakage air and, along with this, water, dirt or the like passes into the axially adjacent reception spaces for the rolling bodies of the rolling bearing of the wheel bearing.

| Reference symbols | |
|---|---|
| 1 | Wheel hub |
| 2 | Journal |
| 3 | Rolling bearing |
| 4', 4' | Seal housing |
| 5', 5' | Inner ring |

| Reference symbols | |
|---|---|
| 5''', 5'''' | Inner ring |
| 6', 6'' | Sliding ring |
| 7', 7'' | Sheet metal ring |
| 7''', 7'''' | Sheet metal ring |
| 8 | Annular space |
| 9 | Passage orifice |
| 10' | Seal |
| 10'' | Seal |
| 11 | Sealing lip |
| 12' | Carrier part |
| 12'' | Carrier part |
| 13 | Bore |
| 14 | Bore |
| 15 | Bore |
| 16 | Bore |
| 17' | Venting valve |
| 17'' | Venting valve |
| 17''' | Venting valve |
| 18' | Seal arrangement |
| 18'' | Seal arrangement |
| 18''' | Seal arrangement |
| 18'''' | Seal arrangement |
| 19 | Outer ring |
| 20 | Outer ring |
| 21 | Rolling body |
| 22 | Rolling body |
| 23 | Seal |
| 24 | Seal |
| 25 | Supply bore in wheel hub |
| 26 | Supply bore in wheel hub |
| 27 | Tire pressure regulating device |
| 28 | Leakage reception space |
| 29 | Leakage reception space |

The invention claimed is:

1. A sealing arrangement for a tire pressure regulating device of a wheel hub of a motor vehicle, comprising:
   a seal housing rotatably fixedly connected to the wheel hub;
   a sliding ring arranged in the housing and having an outer surface in sealing contact with an inner surface of the seal housing; and
   a sheet metal ring arranged coaxially within the sliding ring, the sheet metal ring being pot-shaped so as to define an inner space, the sheet metal ring having a base with a central passage orifice;
   an inner ring of a rolling bearing of a wheel bearing, the inner ring having a bore;
   a compressed air supply to a vehicle tire through the bore in the inner ring; and
   a flat seal fastened to the inner ring, the flat seal having a radially outer end with a sealing lip directed toward the seal housing and bearing against the seal housing.

2. The seal arrangement as claimed in claim 1, wherein the flat seal is manufactured from an elastomeric material or an elastic plastic material.

3. The seal arrangement as claimed in claim 1, wherein leakage reception spaces are formed between the flat seal and the seal housing.

4. The seal arrangement as claimed in claim 3, wherein the flat seal is connected to a carrier part which is arranged firmly on the inner ring of the rolling bearing.

5. The seal arrangement as claimed in claim 4, wherein at least one bore extends centrally through the inner ring, the carrier part and the flat seal to the passage orifice in the base of the sheet metal ring.

6. The seal arrangement as claimed in claim 5, wherein the sheet metal ring contacts the flat seal in a region of the bore.

7. The seal arrangement as claimed in claim 5, wherein additional bores extend through the inner ring, the carrier part, and the flat seal to the leakage reception spaces.

8. The seal arrangement as claimed in claim 7, further comprising venting valves connected to the additional bores at a surface of the inner ring opposing the carrier part.

9. The seal arrangement as claimed in claim 7, wherein a gap extends from an upper edge of the sheet metal ring, between an outer surface of the sheet metal ring and an inner surface of the sliding ring, to the leakage reception spaces.

10. The seal arrangement as claimed in claim 5, wherein additional bores extend through the seal housing from an upper end of the seal housing to the leakage reception spaces.

11. The seal arrangement as claimed in claim 10, further comprising venting valves connected to the additional bores at the upper end of the seal housing.

12. The seal arrangement as claimed in claim 5, wherein the sheet metal ring has a side wall that forms corner regions with the base, additional bores being inclined obliquely inward at the corner regions so as to extend from the inner space to the leakage reception spaces.

13. The seal arrangement as claimed in claim 12, further comprising venting valves connected to the additional bores.

14. The seal arrangement as claimed in claim 1, wherein the sealing lip is inclined obliquely inward toward the seal housing.

* * * * *